(12) United States Patent
Smirnov et al.

(10) Patent No.: US 7,923,876 B2
(45) Date of Patent: Apr. 12, 2011

(54) MOTOR

(75) Inventors: Viatcheslav Smirnov, Suwon-si (KR);
Nam-Seok Kim, Osan-si (KR);
Dong-Yeon Shin, Suwon-si (KR)

(73) Assignee: Samsung Electro-Mechanics Co., Ltd.,
Gyunggi-Do (KR)

( * ) Notice: Subject to any disclaimer, the term of this patent is extended or adjusted under 35 U.S.C. 154(b) by 0 days.

(21) Appl. No.: 12/793,435

(22) Filed: Jun. 3, 2010

(65) Prior Publication Data

US 2010/0237730 A1    Sep. 23, 2010

Related U.S. Application Data

(62) Division of application No. 12/341,254, filed on Dec. 22, 2008, now Pat. No. 7,750,520.

(30) Foreign Application Priority Data

Sep. 22, 2008   (KR) .................. 10-2008-0092827

(51) Int. Cl.
*H02K 5/16*   (2006.01)

(52) U.S. Cl. .......................................................... 310/90
(58) Field of Classification Search ................... 310/90; 384/100
See application file for complete search history.

(56) References Cited

U.S. PATENT DOCUMENTS

| | | | |
|---|---|---|---|
| 6,834,996 B2 | 12/2004 | Gomyo et al. | |
| 2002/0037116 A1 | 3/2002 | Nishida et al. | |
| 2003/0222523 A1 | 12/2003 | Wang et al. | |
| 2005/0140226 A1* | 6/2005 | Braun et al. | 310/90 |
| 2006/0170300 A1* | 8/2006 | Kodama | 310/90 |
| 2006/0202577 A1* | 9/2006 | Maekawa et al. | 310/90 |
| 2007/0290571 A1 | 12/2007 | Yoon | |

* cited by examiner

*Primary Examiner* — Nguyen N Hanh
(74) *Attorney, Agent, or Firm* — McDermott Will & Emery LLP

(57) ABSTRACT

A motor is disclosed. The motor in accordance with an embodiment of the present invention can include: a shaft; a bearing supporting the shaft to rotate; a thrust plate supporting a lower end of the shaft a boss joined to the shaft and having a ring-shaped groove on a side facing the bearing; and a rotor joined to the boss.

1 Claim, 8 Drawing Sheets

MOTOR

CROSS-REFERENCE TO RELATED APPLICATIONS

This application is a Divisional of U.S. patent application Ser. No. 12/341,254, filed on Dec. 22, 2008, now U.S. Pat. No. 7,750,520 and claims the benefit of Korean Patent Application No. 10-2008-0092827, filed with the Korean Intellectual Property Office on Sep. 22, 2008, the entire contents of each of which are hereby incorporated by reference.

BACKGROUND

1. Technical Field

The present invention relates to a motor.

2. Description of the Related Art

A spindle motor, which is used in a driving device of a large-capacity memory storage device such as an optical disk, an ODD slim and a Half height driving set, uses an oil-impregnated bearing to help a shaft to rotate. The oil-impregnated bearing is a kind of a sliding bearing, and is made of a porous material that can contain lubricating oil. The porous material commonly consists of a sintered body.

The oil-impregnated bearing is joined to the shaft such that there exists a constant gap therebetween. The gap is filled with lubricating oil leaked from the oil-impregnated bearing due to the rotation of the shaft. The oil-impregnated bearing can hereby support the shaft to be rotatable.

However, the lubricating oil contained in the oil-impregnated bearing can be leaked not only to the gap between the shaft and the bearing but also to the upper part of the oil-impregnated bearing. When the lubricating oil of the oil-impregnated bearing is lost, the lubrication of the oil-impregnated bearing is deteriorated and a friction between the shaft and the oil-impregnated bearing is increased.

Accordingly, more power is required for driving the spindle motor, and noise and vibration and the like may occur when the motor rotates at a high speed. Besides, some parts of the bearing may be also worn out due to the friction between the shaft and the oil-impregnated bearing, thereby causing a shorter life span of the spindle motor.

SUMMARY

An aspect of the present invention provides a motor capable of preventing lubricating oil of a bearing from being lost through the upper part of the bearing.

One aspect of the invention provides a motor. The motor in accordance with an embodiment of the present invention can include: a shaft; a bearing supporting the shaft to rotate; a thrust plate supporting a lower end of the shaft a boss joined to the shaft and having a ring-shaped groove on a side facing the bearing; and a rotor joined to the boss.

There can be a plurality of the ring-shaped grooves.

A receiving part can be formed on a side of the boss facing the bearing such that an upper side of the bearing can be received. An inner circumferential surface of a side wall of the receiving part can be formed at an angle to an outer circumferential surface of the bearing. A sealing material can be interposed between the receiving part and the bearing.

Meanwhile, the shaft further can include a cylinder part extended downward from an edge of a lower end of the shaft in correspondence to the length of the bearing. A receiving groove can be formed on the thrust plate, the receiving groove receiving a lower end of the cylinder part. The receiving groove can receive even the lower end of the bearing. A supporting protrusion can be formed on the thrust plate. The supporting protrusion protrudes upward such that the lower end of the shaft is supported.

A burring part is formed in the center of the rotor. The burring part protrudes upward and receives the boss. The boss can be extended outward such that an upper side of the bearing can be received by the burring part.

A hollow part can be formed inside the shaft.

DETAILED DESCRIPTION

Figure 1:
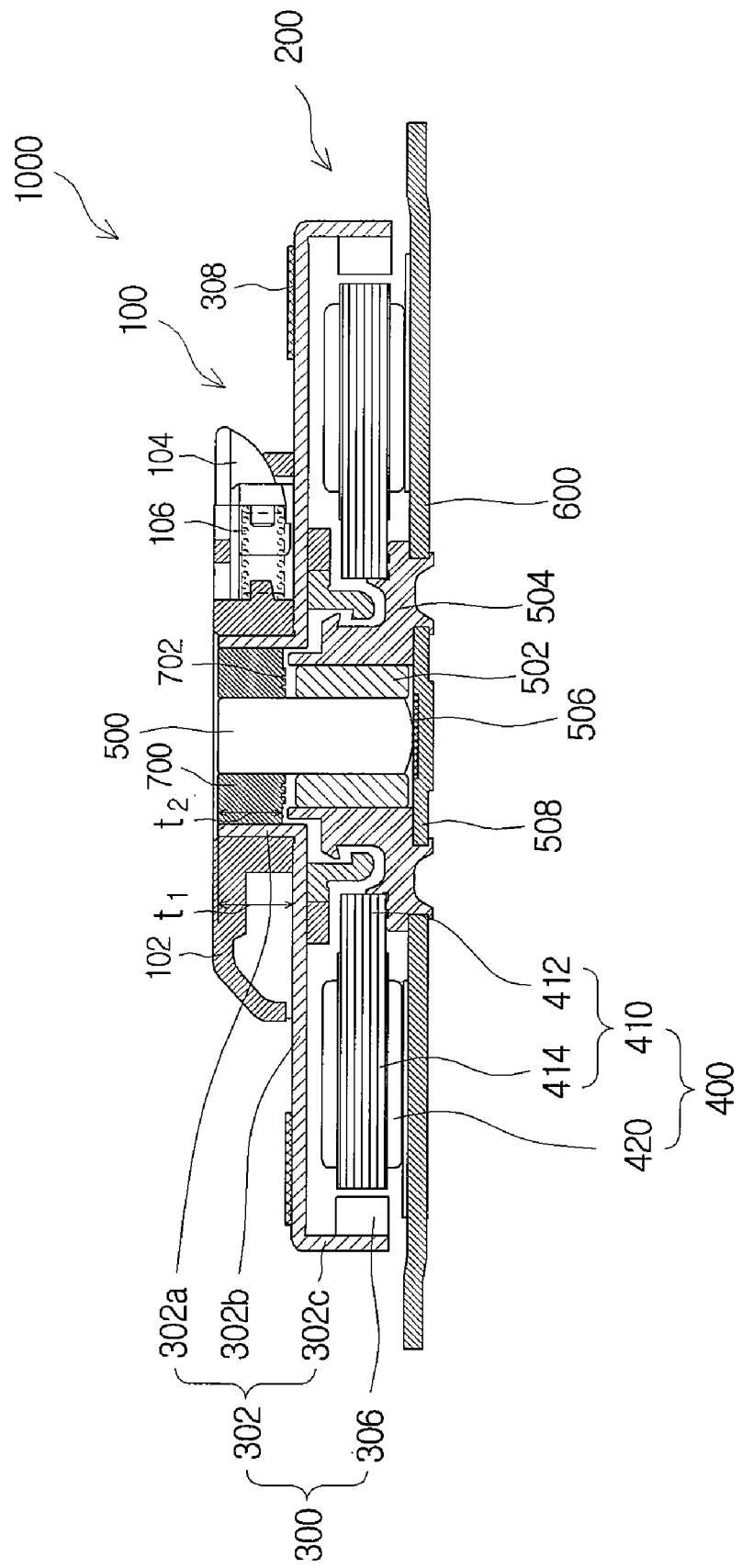
FIG. 1 is a cross sectional view showing a disk driver according to an embodiment of the present invention.

A motor according to certain embodiments of the invention will be described below in more detail with reference to the accompanying drawings, in which those components are rendered the same reference number that are the same or are in correspondence, regardless of the figure number, and redundant explanations are omitted. Also, the basic principles will first be described before discussing the preferred embodiments of the invention.

Hereinafter, an embodiment of the motor according to the present invention will be described in more detail with reference to the accompanying drawings.

A characteristic and an advantage of the present invention will be clear with the following drawings and detailed description of the present invention.

Hereinafter, embodiments of a motor in accordance with the present invention will be described in detail with reference to the accompanying drawings. In description with reference to accompanying drawings, the same reference numerals will be assigned to the same or corresponding elements, and repetitive descriptions thereof will be omitted.

FIG. 1 is a cross sectional view showing a disk driver 1000 according to an embodiment of the present invention. As shown in FIG. 1, a spindle motor used in the disk drive 1000 according to an embodiment of the present invention includes a shaft 500, a bearing 502 supporting the shaft 500 to be rotatable, a thrust plate 508 supporting the lower end of the shaft 500, a boss 700 joined to the shaft 500 and having a ring-shaped groove 702 on a side thereof facing the bearing 502, and a rotor 300 joined to the boss 700. The ring-shaped groove 702 interrupts the lubricating oil flowing out from the bearing 502, so that it is possible to prevent the lubricating oil from flowing to the outside of the bearing 502.

The disk drive 1000 can include a chucking part 100 and a spindle motor 200.

The chucking part 100 can join a disk to the spindle motor 200 such that the disk can be mounted to and demounted from the spindle motor 200. The chucking part 100 can include a housing 102, a chuck-pin 104 and an elastic member 106. The housing 102 can house the chuck-pin 104 and the elastic member 106, and can be joined to the rotor 300. The chuck-pin 104 can be received by the housing 102 such that the chuck-pin 104 is protruded to the outside of the housing 102. The elastic member 106 can elastically support the chuck-pin 104.

When the chucking part 100 is inserted into a through hole formed in the center of the disk, the chuck-pin 104 can move backward and then forward. Once the disk is seated on the rotor 300, the chuck-pin 104 can compress the inner circumferential surface of the disk, allowing the chucking part 100 to join the disk to the spindle motor 200 such that the disk can be mounted to and demounted from the spindle motor.

The bearing can support the shaft 500 to be rotatable. The bearing may be an oil-impregnated bearing 502 containing lubricating oil. There may be a constant gap such that the lubricating oil soaked from the oil-impregnated bearing 502 is interposed between the shaft 500 and the oil-impregnated bearing 502.

A holder 504 can support the oil-impregnated bearing 502. The holder 504 can fix the bearing 502 on a base plate 600 by surrounding the outer circumferential surface of the oil-impregnated bearing 502. Additionally, a stator 400 can be joined to the outer circumferential surface of the holder 504.

The stator 400 can include a stator core 410, which includes both teeth 414 and a ring-shaped body 412, and a coil 420, which is wound on the teeth 414. The teeth 414 can be extended to the outside of the ring-shaped body 412.

The ring-shaped body 412 can be fixed to the holder 504 by joining the inner circumferential surface of the ring-shaped body 412 to the outer circumferential surface of the holder 504. When electricity is supplied to the coil 420, the teeth 414 is magnetized. Then, the rotor 300 can be rotated by the electromagnetic interaction between the teeth 414 and the drive magnet 306.

The thrust plate 508 can be joined to the lower part of the holder 504 so as to support the lower end of the shaft 500. A washer 506 is joined to the upper side of the thrust plate 508 so that the shaft 500 can smoothly rotate.

The rotor 300 includes a rotor case 302, the drive magnet 306 and a friction member 308. The rotor case 302 can include a burring part 302a, an expansion part 302b and an extension part 302c. The burring part 302a may have a cylinder shape protruding upward in the center of the rotor case 302, and may be formed by bending the central part of the rotor case 302. The boss 700 can be joined to the shaft 500 by being inserted within the burring part 302a.

The expansion part 302b is radially extended from the lower end of the burring part 302a and can cover the stator 400. The basal surface of the disk on which the chucking part 100 is seated can be supported by joining a ring-shaped friction member 308 to the upper side of the expansion part 302. The extension part 302c is extended downward from the lower end of the expansion part 302b and the drive magnet 306 can be joined to the inner circumferential surface of the extension part 302c.

The boss 700 can be interposed between the shaft 500 and the burring part 302a. The boss 700 has a ring shape. The inner circumferential surface of the boss 700 can be joined to the shaft 500 and the outer circumferential surface of the boss 700 can be joined to the burring part 302a. The thickness t2 of the boss 700 can be smaller than the thickness t1 of the burring part 302a. The boss 700 can be inserted and fixed to the burring part 302a such that the upper surface of the boss 700 is aligned with the upper surface of the burring part 302a.

The boss 700 can be extended to the outside thereof in order that the upper part of the oil-impregnated bearing 502 can be received by the burring part 302a. That is, as the outside diameter of the boss 700 and the inside diameter of the burring part 302a are formed to be larger than the outside diameter of the oil-impregnated bearing 502, the upper part of the oil-impregnated bearing 502 can be received by the burring part 302a.

Since the upper part of the oil-impregnated bearing 502 is received by the burring part 302a, the entire length of the oil-impregnated bearing 502 may be increased as long as a part of the oil-impregnated bearing 502 is inserted into the burring part 302a. As a result, it is possible that the bearing working length of the oil-impregnated bearing 502 for supporting the shaft 500 is increased.

In case the shaft is supported by use of the oil-impregnated bearing, there may be a gap between the shaft and the oil-impregnated bearing, causing the shaft to rotate in an angle with respect to the oil-impregnated bearing.

In this case, the shaft is supported by both symmetrical ends of the oil-impregnated bearing. Mutual friction between the both ends causes the life span of the oil-impregnated bearing to be reduced, and then the life span of the spindle motor is eventually shortened.

Accordingly, the shaft 500 can be more stably supported by the oil-impregnated bearing 502 through increase of the bearing working length of the oil-impregnated bearing 502 for supporting the shaft 500, and then such a problem can be solved. Besides, since the shaft 500 is more stably supported by the oil-impregnated bearing 502, it is also possible to reduce unnecessary noise and vibration caused by the vibration of the shaft 500.

Meanwhile, because the bearing working length of the oil-impregnated bearing 502 for supporting the shaft 500 can be increased as much as a thickness difference between the boss 700 and the burring part 302a by inserting the boss into the burring part 302a of a simple shape, an additional manufacturing cost of the rotor case 302 can be prevented.

As the disk drive 1000 which uses the spindle motor 200 obtaining structural stability of the shaft 500 is able to ensure the stable driving of the disk and to stably perform reading/writing.

In the meantime, since the burring part 302a receives the upper part of the oil-impregnated bearing 502, the expansion part 302b and the extension part 302c coving the stator 400 can be, as a whole, closer to the base plate 600. This signifies that the spindle motor 200 is ensured to be thinner.

As the extension part 302c of the rotor case is closer to the base plate 600, the drive magnet 306 is also able to be closer to the base plate 600. Therefore, the magnetic core of the stator 400 is guaranteed to be identical to the magnetic core of the drive magnet 306, acoustic noise can be reduced.

Figure 2:
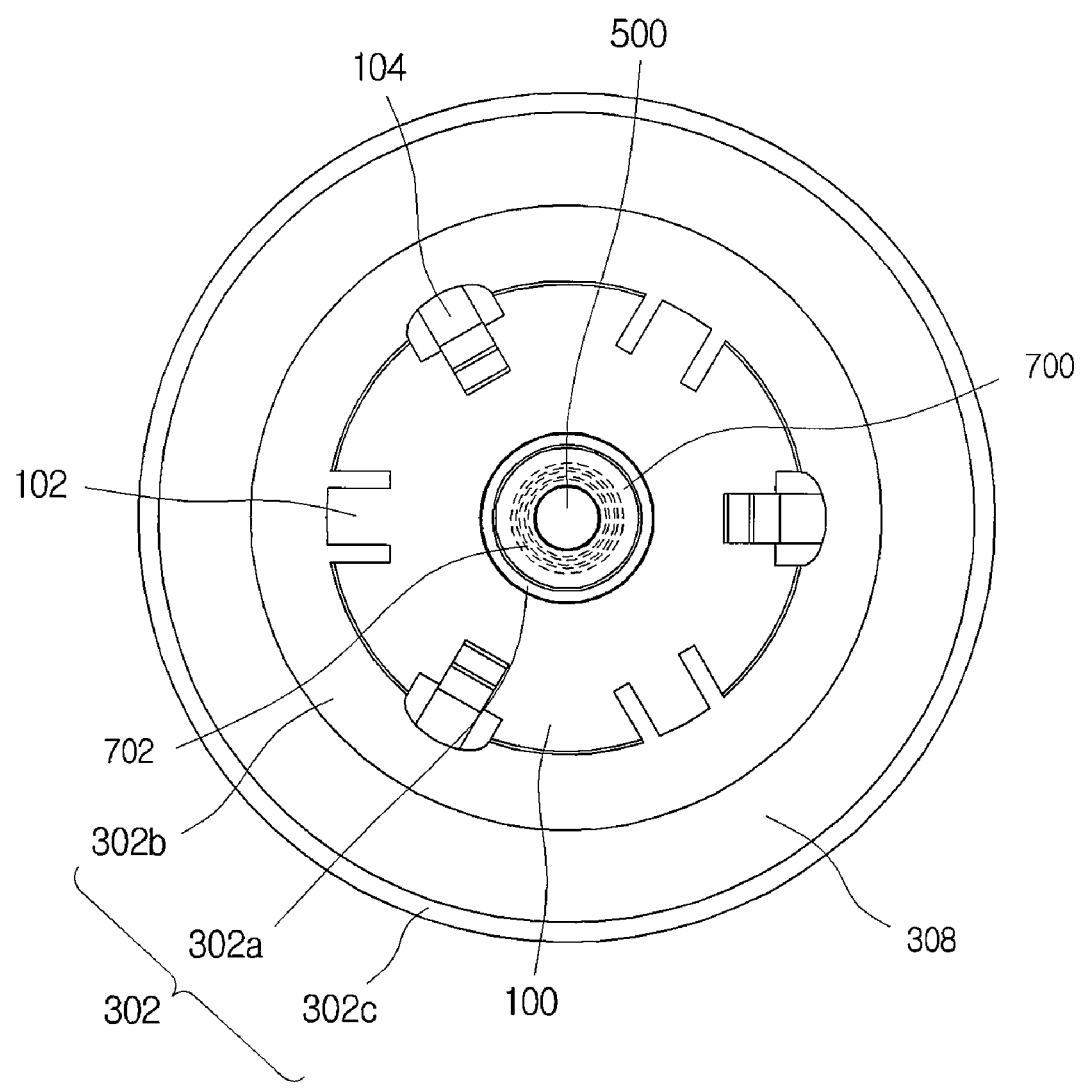
FIG. 2 is a plan view showing a disk driver according to an embodiment of the present invention.

The ring-shaped groove 702 can be formed on a side of the boss 700, which faces the bearing 502, that is, the basal surface of the boss 700. FIG. 2 is a plan view showing a disk driver 1000 according to an embodiment of the present invention.

As shown in FIG. 2, there may be a plurality of the ring-shaped grooves 702. The centers of the plurality of the ring-shaped grooves 702 can be identical to the center of the shaft 500. The ring-shaped groove 702 is formed on the path of the lubricating oil flowing out from the oil-impregnated bearing 502, and interrupts the flow of the lubricating oil by receiving the flowing lubricating oil. Consequently, it is possible to prevent the lubricating oil from flowing out from the oil-impregnated bearing 502.

Figure 3:
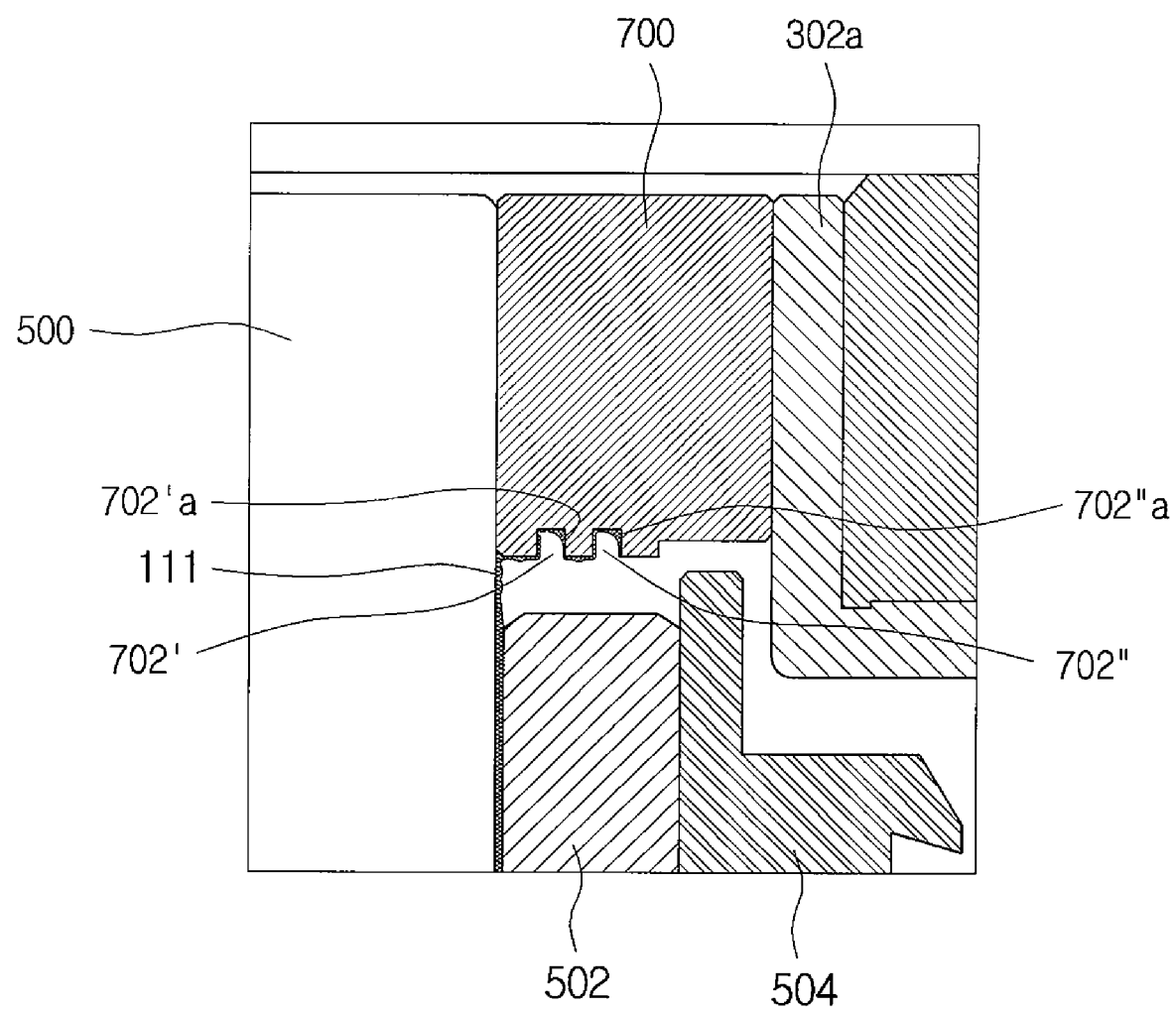
FIG. 3 is a cross sectional view showing a part of a disk driver according to an embodiment of the present invention.

FIG. 3 is a cross sectional view showing a part of a disk driver 1000 according to an embodiment of the present invention. As shown in FIG. 3, if the shaft 500 rotates, due to air flow around the rotor 300, the pressure between the oil-impregnated bearing 502 and the boss 700 may be lower than that between the oil-impregnated bearing 502 and the shaft 500.

Here, owing to the rotation of the shaft 500, the lubricating oil 111 leaked between the shaft 500 and the oil-impregnated bearing 502 may rise along the outer circumferential surface of the shaft 500. The lubrication oil 111, having risen, can move to the outside of the boss 700 along the basal surface of the boss 700 due to centrifugal force and viscosity between the lubricating oil 111 and the basal surface of the boss 700.

The lubricating oil 111 moving along the basal surface of the boss 700 can be received by the ring-shaped groove 702. While the lubricating oil 111 received by the ring-shaped grooves 702' and 702" is constantly subjected to the centrifugal force, the side wall 702a of the ring-shaped groove restricts the flow of the lubricating oil against the centrifugal force. Therefore, the lubricating oil 111 is not allowed to move to the outside of the boss 700 any more.

Even though the flow of the lubricating oil 111 continues to increase so that the lubricating oil 111 overflows the ring-shaped groove 702' of the inside of the boss 700, the ring-shaped groove 702" of the outside of the boss 700 can prevent the flow of the lubricating oil 111 by the same operation as that of the ring-shaped groove 702' of the inside of the boss 700. It shall be evident that the number of the ring-shaped groove 702 can be controlled by taking the amount of the flow of the lubricating oil and the size of the boss 700 into consideration.

Figure 4:
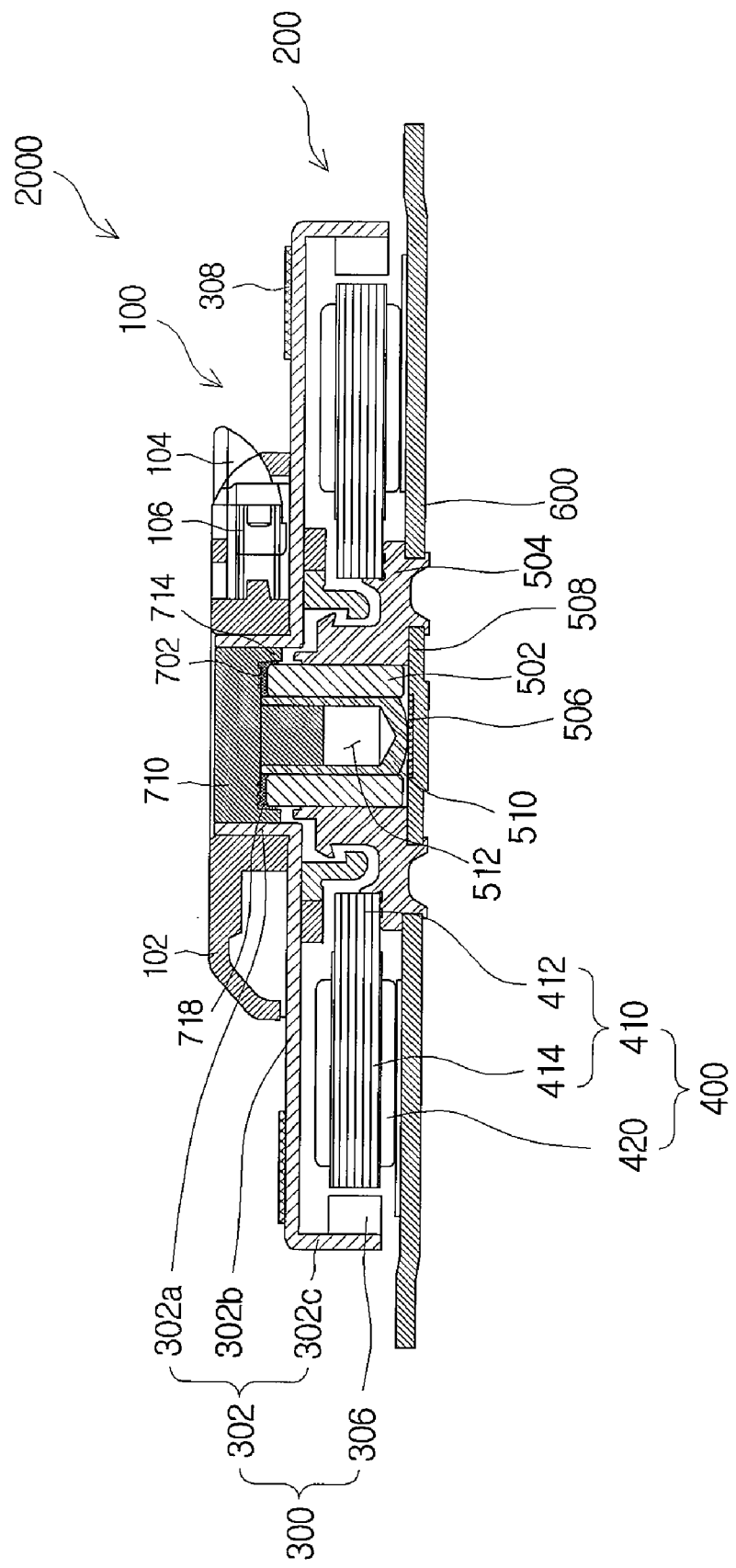
FIG. 4 is a cross sectional view showing a disk driver according to another embodiment of the present invention.
Figure 5:
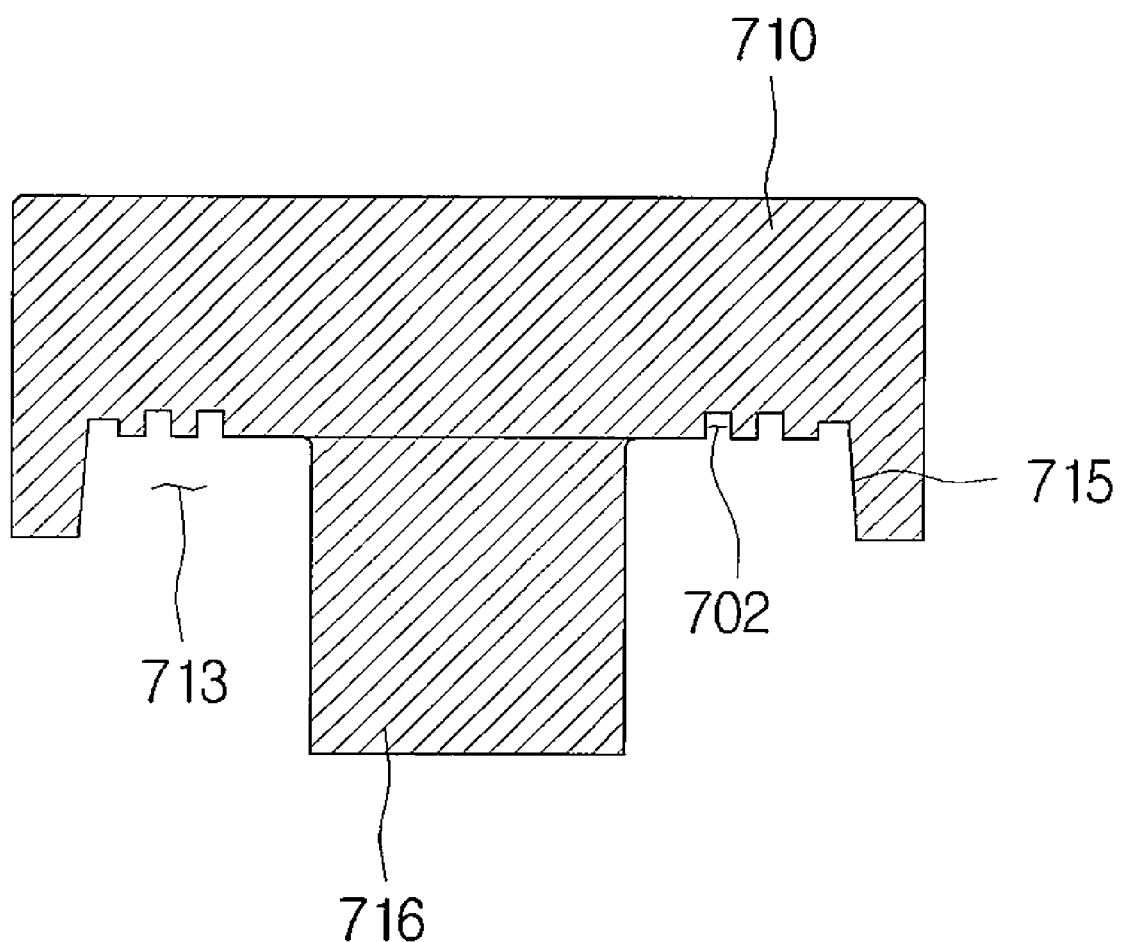
FIG. 5 is a cross sectional view showing a boss of a disk driver according to another embodiment of the present invention.

FIG. 4 is a cross sectional view showing a disk driver 2000 according to another embodiment of the present invention. FIG. 5 is a cross sectional view showing a boss 710 of a disk driver 2000 according to another embodiment of the present invention.

As shown in FIGS. 4 and 5, the boss 710 of the disk driver 2000 according to another embodiment of the present invention can have a receiving part 713 formed on a side of the boss 710 facing the oil-impregnated bearing 502 in order that the upper part of the oil-impregnated bearing 502 can be received. The formed receiving part 713 allows the oil-impregnated bearing 502 to further enter the boss 710. Consequently, the bearing working length of the oil-impregnated bearing 502 for supporting the shaft 510 can be increased.

The width in thickness direction of the outer circumferential surface of the boss 710, which comes in contact with the inner circumferential surface of the burring part 302a, may not be reduced regardless of the bearing working length of the oil-impregnated bearing 502 for supporting the shaft 510. As a result, the bearing working length of the oil-impregnated bearing 502 for supporting the shaft 510 can be increased while the boss 710 and the rotor 300 are more securely joined.

As shown in FIG. 5, a protruding part 716 is formed in the middle of the lower part of the boss 710 and can be inserted into the shaft 510. The protruding part 716 can be integrally formed with the boss 710 or can be separately manufactured to be joined to the boss 710.

The inside of the shaft 510 can have a hole for receiving the protruding part 716 of the boss 710. The hole may be deeper than the length of the protruding part 716. Therefore, although the boss 710 is joined to the shaft 510, the hole in the middle of the shaft 510 cannot be completely filled with the protruding part 716 of the boss 710 so that a hollow part 512 may be formed inside the shaft 510.

The rotating parts in the disk drive 2000 can be the chucking part 100, the rotor 300, the shaft 510 and the boss 710. As the hollow part 512 is formed inside the shaft 510 among them, a moment of inertia as well as the weight of the rotating parts can be reduced. Accordingly, it is possible to reduce the electric power required for driving the spindle motor 200.

Figure 6:
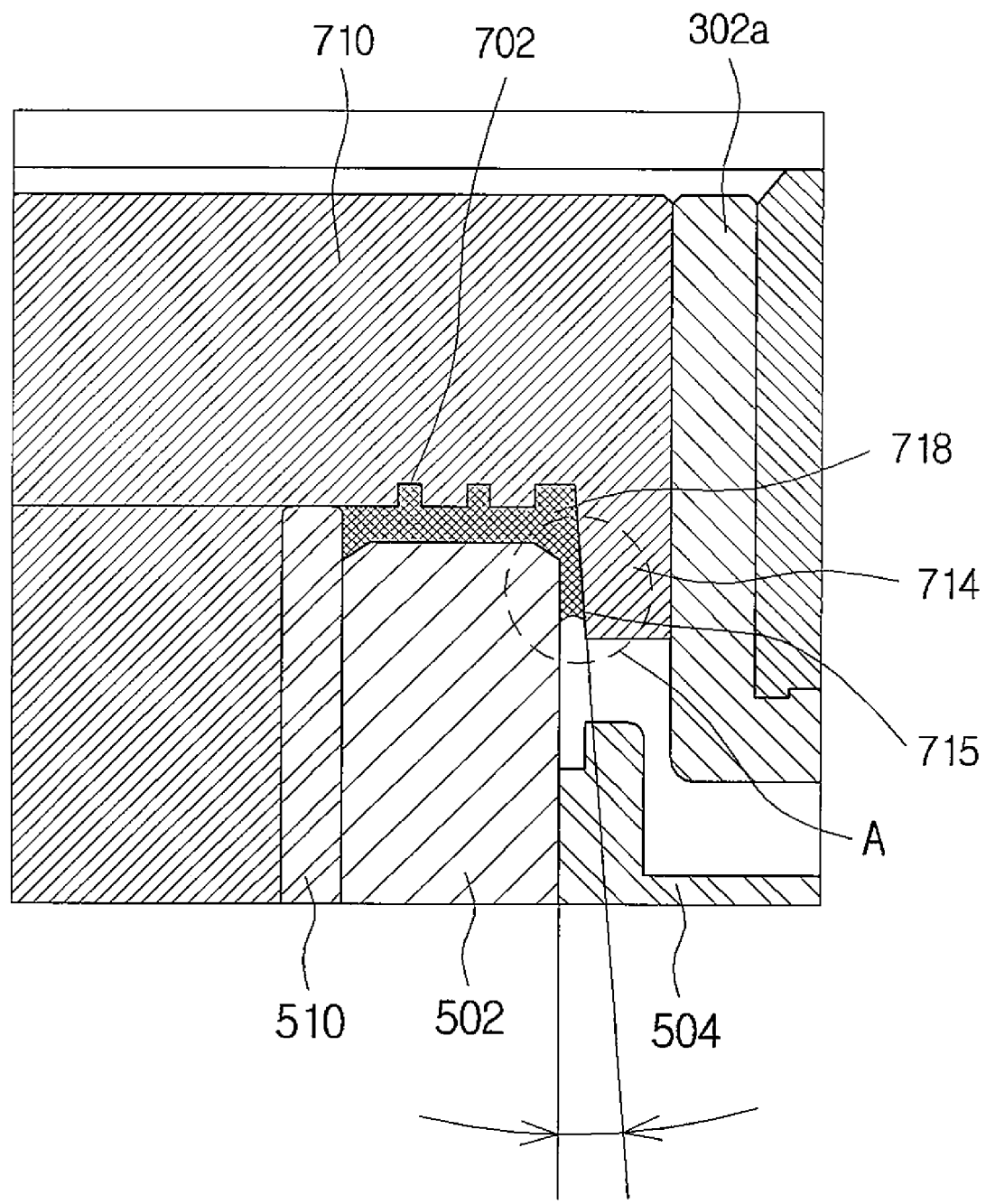
FIG. 6 is a cross sectional view showing a part of a disk driver according to another embodiment of the present invention.

FIG. 6 is a cross sectional view showing a part of a disk driver 2000 according to another embodiment of the present invention. As shown in FIG. 6, a sealing material 718 can be interposed between the boss 710 and the oil-impregnated bearing 502.

The sealing material 718 can prevent the lubricating oil from flowing out from the oil-impregnated bearing 502 by sealing the space between the oil-impregnated bearing 502 and the boss 710. The sealing material 718 is made of a material, such as grease, having viscosity higher than that of the lubricating oil.

The inner circumferential surface 715 of the receiving part side wall 714 can be formed at an angle to the outer circumferential surface of the oil-impregnated bearing 502. The receiving part 713 can be formed such that the inside diameter, which the inner circumferential surface 715 of the receiving part side wall 714 forms, increases more toward a farther lower part of the receiving part. As a result, a distance between the inner circumferential surface 715 of the receiving part side wall 714 and the outer circumferential surface of the oil-impregnated bearing 502 can be more increased toward a farther lower part of the receiving part.

Even if the sealing material 718 is not interposed between the oil-impregnated bearing 502 and the boss 710, a taper-shaped gap "A" formed between the inner circumferential surface 715 of the side wall 714 and the outer circumferential surface of the oil-impregnated bearing 502 can prevent the lubricating oil from flowing out by means of the surface tension effects of the flowing lubricating oil.

Eventually, the taper-shaped gap "A" formed between the inner circumferential surface 715 of the receiving part side wall 714 and the outer circumferential surface of the oil-impregnated bearing 502 can be designed for self-sealing.

Figure 7:
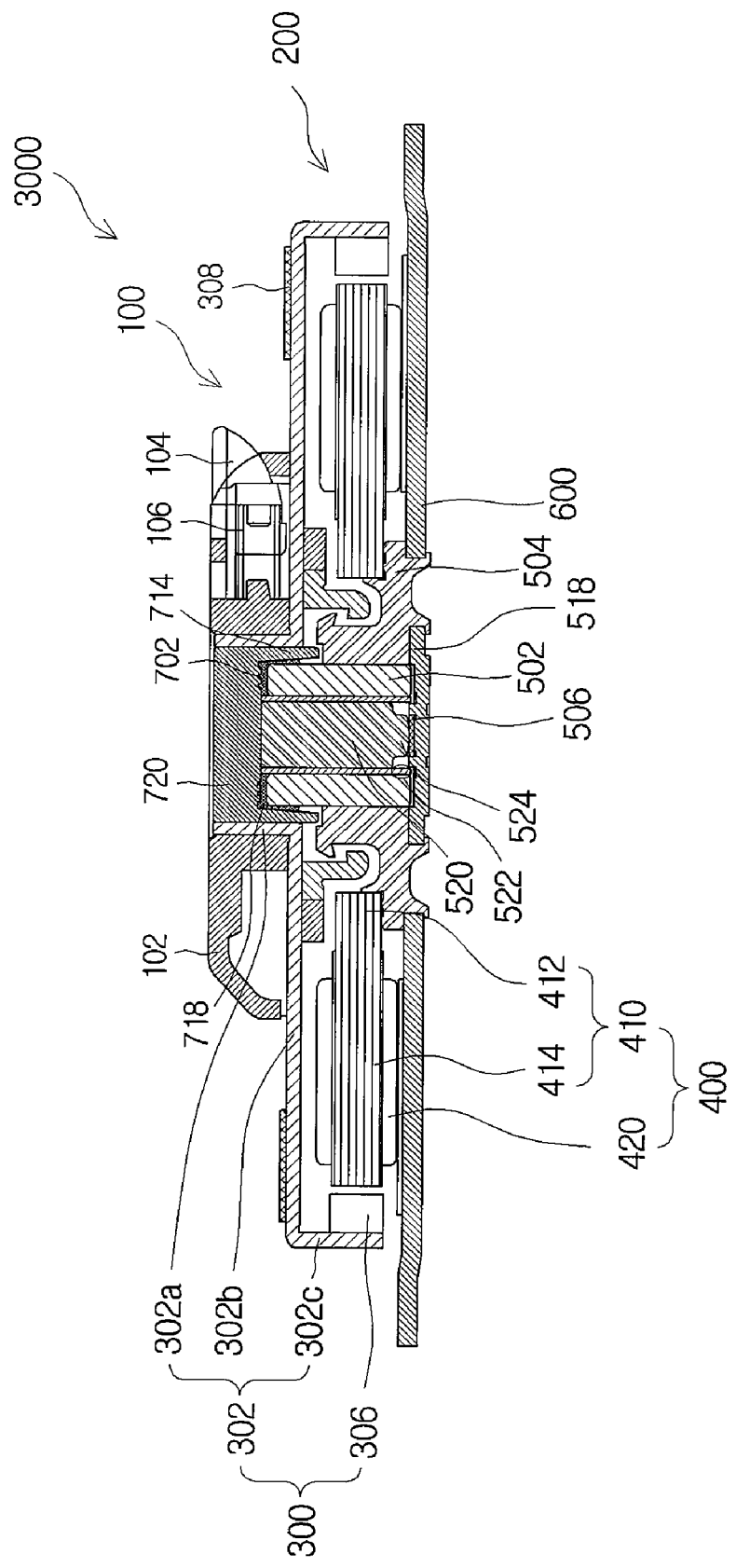
FIG. 7 is a cross sectional view showing a disk driver according to yet another embodiment of the present invention.

FIG. 7 is a cross sectional view showing a disk driver 3000 according to yet another embodiment of the present invention. As shown in FIG. 7, a shaft 520 of the disk driver 3000 according to yet another embodiment of the present invention can further include a cylinder part 522 extending downward from the edge of the lower end of the shaft 520.

In other words, the cylinder part 522 is formed to be extended downward from the edge of the lower end of the shaft 520 in order that a bearing working length of the oil-impregnated bearing 502 for supporting the shaft 520 is increased by extending the outer circumferential surface of the shaft 520 in the direction of length thereof.

The cylinder part 522 can have a cylinder shape surrounding the outer circumferential surface of the shaft 520 and can be extended to have the same length as that of the inner circumferential surface of the oil-impregnated bearing 502. Additionally, the cylinder part 522 can be also integrally formed with the shaft 520 unlike the embodiment of the present invention.

Figure 8:
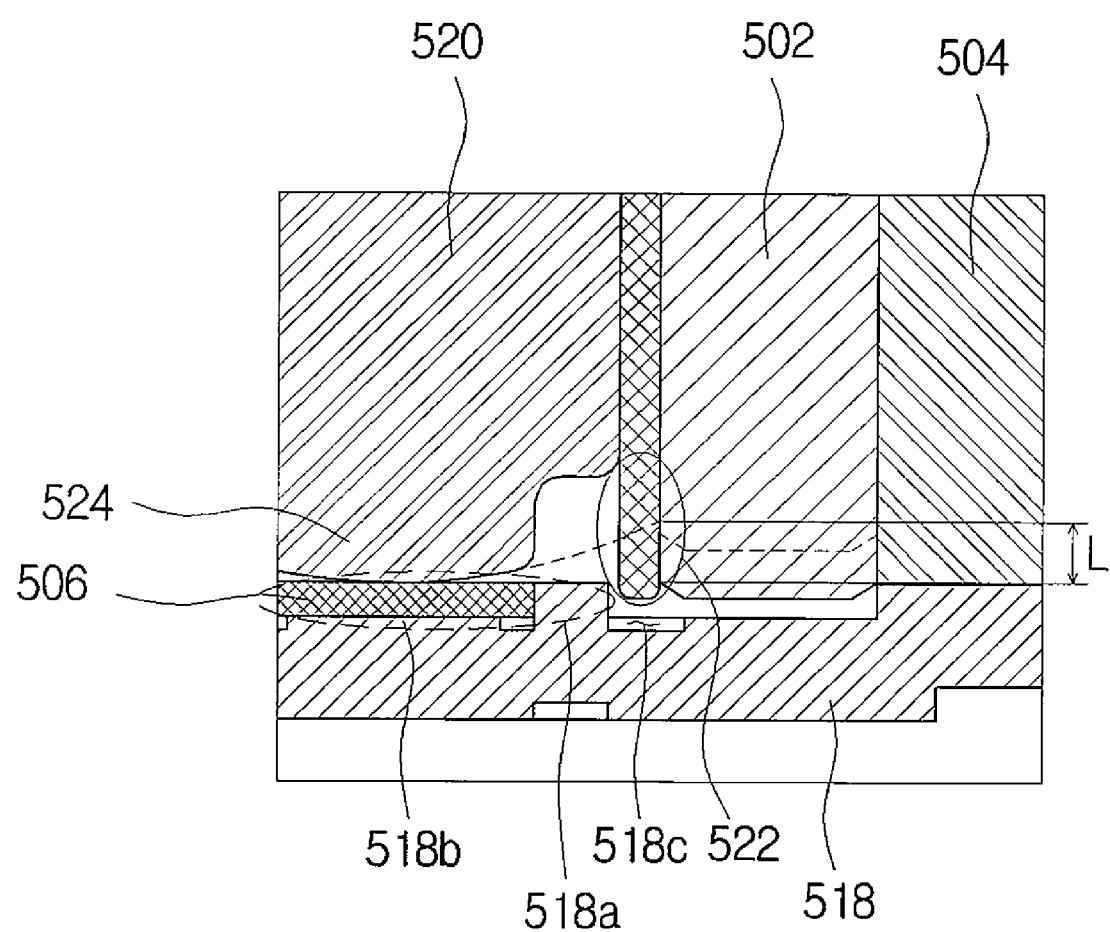
FIG. 8 is a cross sectional view showing a part of a disk driver according to yet another embodiment of the present invention.

FIG. 8 is a cross sectional view showing a part of a disk driver 3000 according to yet another embodiment of the present invention. As shown in FIG. 8, the cylinder part 522 forms an additional surface for contact with the oil-impregnated bearing 502 on the outer circumferential surface of the shaft 520, thereby extending the bearing working length of the oil-impregnated bearing 502 for supporting the shaft 520

(by as long as "L" of FIG. 8) as compared with that of a conventional technology (dotted lines of FIG. 8).

A rounding treatment is performed on the lower end of the shaft 520 so as to minimize the friction of the lower end of the shaft 520. The length of the cylinder-shaped outer circumferential surface of the shaft 520 is hereby reduced so that the bearing working length of the oil-impregnated bearing 502 for supporting the shaft 520 may be reduced. With regard to this matter, it is possible to supplement the length of the oil-impregnated bearing 502 for supporting the shaft 520 by forming the cylinder part 522. The cylinder part 522 is therefore able to supply the lower end of the shaft 520 with an additional length as long as "L" of FIG. 8 of the oil-impregnated bearing 502 for supporting the shaft 520.

Both a supporting protrusion 518a protruding upward for supporting the lower end 524 of the shaft 520 and a receiving groove 518c receiving the lower end of the cylinder part 522 can be formed on the thrust plate 518.

As described above, the cylinder part 522, i.e., a part extending downward from the edge of the lower end of the shaft 520, can extend the length of the outer circumferential surface of the shaft 520. In correspondence to this, the supporting protrusion 518a can protrude upward on the upper side of the thrust plate 518 in order to prevent the cylinder part 522 from coming into contact with the upper side of the thrust plate 518.

The washer 506 may be joined to the upper side of the supporting protrusion 518a in order to reduce the friction between the lower end of the shaft 520 and the supporting protrusion 518a. If the washer 506 is joined, a groove 518b having a thickness the same as that of the washer 506 is formed in the supporting protrusion 518a, so that the upper side of the supporting protrusion 518a can have the same height as that of the upper side of the washer.

The receiving groove 518c receiving the lower end of the cylinder part 522 can be formed on the upper side of the thrust plate 518 adjacently to the supporting protrusion 518a. The receiving groove 518c can be formed of a ring-shaped groove adjacently to the supporting protrusion 518a.

The receiving groove 518c can extend the bearing working length of the oil-impregnated bearing 502 for supporting the shaft 520 by receiving the lower end of the cylinder part 522 having an extended-length that is longer than the length of the shaft 520.

The receiving groove 518c can receive even the lower end of the oil-impregnated bearing 502. In order to increase the bearing working length of the oil-impregnated bearing 502 for supporting the shaft 520, the oil-impregnated bearing 502 can be extended such that the length of the oil-impregnated bearing 502 is longer than that of the shaft 520. In correspondence to this, the length of the cylinder part 522 can be also extended.

With the view of receiving both the cylinder part 522 having an extended-length that is longer than the length of the shaft 520 and the lower end of the oil-impregnated bearing 502, the receiving groove 518c can be extended to the outside such that the outside diameter thereof is more than the outside diameter of the oil-impregnated bearing 502.

Consequently, it is possible to increase the bearing working length of the oil-impregnated bearing 502 for supporting the shaft 520 without increasing the overall height of the spindle motor 200.

While the present invention has been described with reference to exemplary embodiments thereof, it will be understood by those skilled in the art that various changes and modification in forms and details may be made without departing from the spirit and scope of the present invention as defined by the appended claims.

What is claimed is:

1. A motor comprising:
   a shaft having a hole therein;
   a bearing configured to support the shaft to rotate and containing lubricating oil;
   a thrust plate configured to support a lower end of the shaft;
   a boss joined to the shaft and having a ring-shaped groove on a side facing the bearing, such that the ring-shaped groove is formed on the path of the lubricating oil flowing out from the bearing, and interrupts the flow of the lubricating oil by receiving the flowing lubricating oil; and
   a rotor joined to the boss,
   wherein a protruding part is formed in the middle of the lower part of the boss, and the hole of the shaft receives the protruding part of the boss such that a hollow part is formed inside the shaft.

* * * * *